United States Patent
Dunne et al.

(10) Patent No.: US 10,541,960 B2
(45) Date of Patent: Jan. 21, 2020

(54) MANAGING MESSAGE NOTIFICATIONS IN A COMPUTING ENVIRONMENT

(71) Applicant: International Business Machines Corporation, Armonk, NY (US)

(72) Inventors: Jonathan Dunne, Dungarvan (IE); Chen Jiang, Beijing (CN); Xue Yong Zhang, Beijing (CN); Xin Zheng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 15/450,817

(22) Filed: Mar. 6, 2017

(65) Prior Publication Data

US 2018/0255013 A1 Sep. 6, 2018

(51) Int. Cl.
*G06F 15/16* (2006.01)
*H04L 12/58* (2006.01)

(52) U.S. Cl.
CPC .............. *H04L 51/24* (2013.01); *H04L 51/16* (2013.01)

(58) Field of Classification Search
CPC ...... G06Q 10/107; G06Q 10/10; H04L 51/24; H04L 12/587; H04L 43/106; H04L 12/26; H04L 15/58; G06F 15/16; G04L 43/04; G06N 99/005; G06N 99/00
See application file for complete search history.

(56) References Cited

U.S. PATENT DOCUMENTS

| | | | |
|---|---|---|---|
| 6,711,154 B1 | 3/2004 | O'Neal | |
| 7,856,469 B2 | 12/2010 | Chen et al. | |
| 8,175,581 B2 | 5/2012 | Heidloff et al. | |
| 9,285,966 B2 | 3/2016 | Bechtel et al. | |
| 9,380,015 B2 | 6/2016 | Turski et al. | |
| 2005/0212751 A1 | 9/2005 | Marvit et al. | |
| 2007/0174408 A1 | 7/2007 | Paul et al. | |
| 2008/0294730 A1* | 11/2008 | Oral | G06Q 10/107 709/206 |

(Continued)

OTHER PUBLICATIONS

Mateo et al., "Filtered-Push Notification Framework for Messaging Support in Parking Information System", ResearchGate, Aug. 2012, 12 pages, <https://www.researchgate.net/publication/264067409_Filtered-Push_Notification_Framework_for_Messaging_Support_in_Parking_Information_System>.

(Continued)

*Primary Examiner* — Cheikh T Ndiaye
(74) *Attorney, Agent, or Firm* — Maeve M. Carpenter; Randy E. Tejeda

(57) ABSTRACT

A tool for managing message notifications in a computing environment includes a computer determining a user receives a notification of a first message received in a collaboration application on a computing device of the user, and determining a topic for the first message. The computer then determines whether the user suppresses the notification of the first message, and if so, the computer stores the topic for the first message associated with an indication the user suppressed the notification for the collaboration application. The computer further determines a second message is received, determines a topic of the second message, and then determines whether the user previously suppressed the topic of the second message. If the user previously suppressed the topic of the second message, the computer suppresses a notification for the second message.

20 Claims, 6 Drawing Sheets

(56) References Cited

U.S. PATENT DOCUMENTS

| | | | |
|---|---|---|---|
| 2009/0063638 A1 | 3/2009 | Guo et al. | |
| 2009/0100141 A1 | 4/2009 | Kirkland et al. | |
| 2010/0262666 A1* | 10/2010 | Kalu | G06Q 10/107 709/206 |
| 2012/0198002 A1* | 8/2012 | Goulart | H04L 51/36 709/206 |
| 2012/0278475 A1* | 11/2012 | Papakipos | G06Q 10/10 709/224 |
| 2012/0317521 A1 | 12/2012 | Ludwig | |
| 2013/0227418 A1* | 8/2013 | Sa | G06F 3/0488 715/728 |
| 2013/0282835 A1 | 10/2013 | Bates et al. | |
| 2014/0310357 A1 | 10/2014 | Banatwala et al. | |
| 2015/0004945 A1 | 1/2015 | Steeves et al. | |
| 2015/0169068 A1 | 6/2015 | Plagemann et al. | |
| 2015/0350147 A1 | 12/2015 | Shepherd et al. | |
| 2016/0037481 A1* | 2/2016 | Won | H04W 68/00 715/771 |
| 2016/0065515 A1* | 3/2016 | Strode | H04L 51/24 709/206 |
| 2016/0164986 A1* | 6/2016 | Chen | G06F 3/0488 715/753 |

OTHER PUBLICATIONS

Rkent, "Controlling notification with filters", MesQuilla, Jan. 16, 2009, 4 pages, <http://mesquilla.com/2009/01/16/controlling-notification-with-filters/>.

Dunne et al., "Managing Message Notifications in a Computing Environment", U.S. Appl. No. 15/697,824, filed Sep. 7, 2017, 31 pages.

Mell et al., "The NIST Definition of Cloud Computing", Recommendations of the National Institute of Standards and Technology, Special Publication 800-145, Sep. 2011, 7 pages.

IBM, Appendix P, List of IBM Patents or Patent Applications Treated as Related, dated Sep. 7, 2017, 2 pages.

* cited by examiner

MANAGING MESSAGE NOTIFICATIONS IN A COMPUTING ENVIRONMENT

BACKGROUND

The present invention relates generally to the field of collaboration applications, and more particularly to managing message notifications for a user involved in one or more collaboration applications via at least one network.

Social and collaboration applications are becoming increasingly popular in everyday life. Often, a user is a member of several different collaboration applications and may be conducting ongoing communications with various other users of the collaboration applications via at least one network in one or more computing environments. Each application may provide a notification to the user when a message is received in any ongoing communication, which can prove to be a distraction to the user. While the user may be able to suppress all notifications from each application, this may result in the user missing important messages containing timely information or action items.

SUMMARY

Embodiments of the present invention disclose a method, a computer program product, and a computer system for managing message notifications. The method may include a computer determining a user receives a notification of a first message received in a collaboration application on a computing device of the user, and determining a topic for the first message. The method then includes the computer determining whether the user suppresses the notification of the first message. Responsive to determining that the user suppressed the notification, the method then includes the computer storing the topic for the first message associated with an indication the user suppressed the notification for the collaboration application.

DETAILED DESCRIPTION

In messaging and collaboration applications in a computing environment, a user can select whether or not to receive notifications of messages and alerts sent within the applications. Embodiments of the present invention recognize that current technology limits the user selection to an all or nothing approach, such that a user may select to receive all notifications or no notifications for a specific collaboration or messaging application. There exists, therefore, a need for a computer solution to the problem identified for collaboration applications in a computing environment. Embodiments of the present invention provide a specific means in which to solve the problem by learning one or more user preferences for which topics the user would like to receive message notifications and implementing those learned preferences when future messages are received. Embodiments of the present invention provide various technical computing advantages, including improvements to how a user can interact with and utilize a collaboration application. These improvements allow a user to continue use of the collaboration application while otherwise occupied, yet still receive notification of important messages, as opposed to constantly being interrupted by all notifications or missing information due to receiving no notifications. Additionally, embodiments of the present invention provide improvements to determining when a user is choosing to suppress a notification by creating a gesture map based on learning which gestures a user may utilize to suppress notifications received in one or more collaboration applications.

Figure 1:
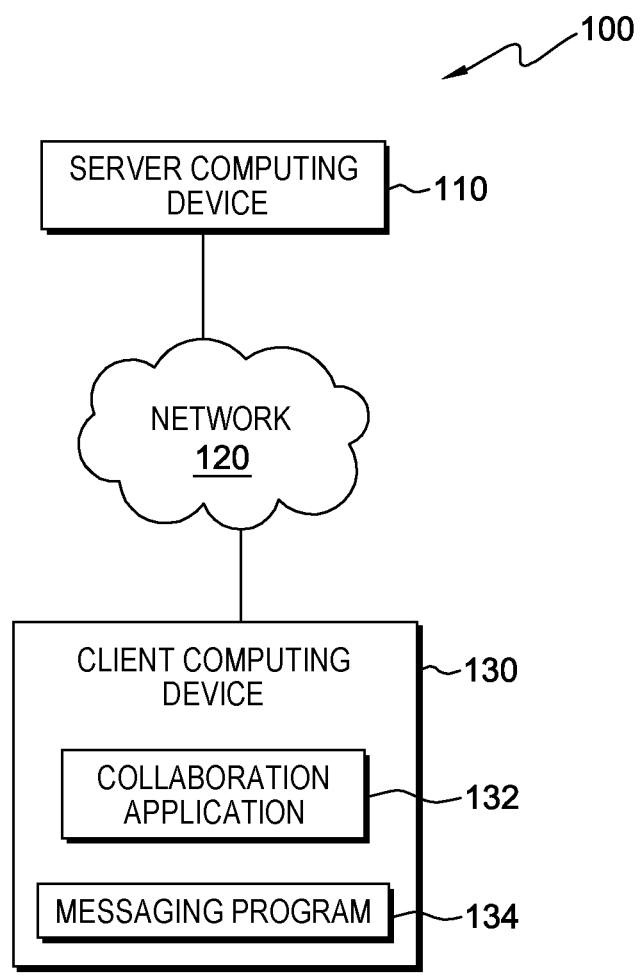
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. In an embodiment, data processing environment 100 may be a distributed data processing environment. The term "distributed" can describe a computer system that includes multiple, physically distinct devices that operate together as a single computer system. FIG. 1 provides only an illustration of one implementation and does not imply any limitations with regard to the environments in which different embodiments may be made by those skilled in the art without departing from the scope of the invention as recited by the claims.

Data processing environment 100 includes server computing device 110 and client computing device 130, interconnected via network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between server computing device 110, client computing device 130, and other computing devices (not shown) within data processing environment 100.

Server computing device 110 can be a standalone computing device, a management server, a web server, a mobile computing device, or any other electronic device or computing system capable of receiving, sending, and processing data. In other embodiments, server computing device 110 can represent a server computing system utilizing multiple computers as a server system, such as in a cloud computing environment. In another embodiment, server computing device 110 can be a laptop computer, a tablet computer, a netbook computer, a personal computer (PC), a desktop computer, a personal digital assistant (PDA), a smart phone, or any programmable electronic device capable of communicating with client computing device 130 and other computing devices (not shown) within data processing environment 100 via network 120. In another embodiment, server computing device 110 represents a computing system utilizing clustered computers and components (e.g., database server computers, application server computers, etc.) that act as a single pool of seamless resources when accessed within data processing environment 100. Server computing device 110 may include internal and external hardware components, as depicted and described in further detail with respect to FIG. 4.

In various embodiments of the present invention, client computing device 130 can be one of a laptop computer, a tablet computer, a smart phone, or any programmable electronic device capable of communicating with various components and devices within data processing environment 100, via network 120. In general, client computing device 130 represents any programmable electronic device or combination of programmable electronic devices capable of executing machine readable program instructions and communicating with other computing devices (not shown) within data processing environment 100 via a network, such as network 120. Client computing device 130 includes collaboration application 132 and messaging program 134. In various embodiments, either collaboration application 132 and/or messaging program 134 may reside on server computing device 110 in data processing environment 100. Client computing device 130 may include internal and external hardware components, as depicted and described in further detail with respect to FIG. 4.

Collaboration application 132 is a mobile application software program, or a "mobile app" or an "app", designed to run on a smart phone, a tablet computer, or other mobile devices. Collaboration application 132 may be any native application or pre-installed software on a mobile computing device, such as client computing device 130. A native application can be, for example, a web browser, email client, mapping program, or an app for purchasing music, other media, or additional apps. Collaboration application 132 may be a software application or a web application that can run in a mobile web browser. Collaboration application 132 may be any app purchased by the user of client computing device 130, for example, a messaging app, a server based communication app, a social media app, an app providing for purchasing or selling items and receiving communication associated therewith, or an app including capabilities to allow a user to comment and receive comment on posted items or messages. In embodiments of the present invention, collaboration application 132 is a messaging application, a social media application, a chat group, or other mobile application allowing a user to communicate with other users of the mobile application within the mobile application itself. In various embodiments, collaboration application 132 is a client side instance of a server based messaging application. Although depicted in FIG. 1 as one instance, one of skill in the art will understand that there may be one or more instances of collaboration application 132 on client computing device 130.

Messaging program 134 monitors messages and message notifications received to client computing device 130 via collaboration application 132, and is capable of learning, based on user action taken when a message notification is received, user preferences for which message notifications to suppress and which message notifications to transmit to the user. Messaging program 134 determines a topic associated with each message received and stores the topic with an indication of whether the user suppressed the notification for that topic or read the message after receiving the notification associated with that topic. Messaging program 134 monitors further messages received by the user and, based on the determined topic of each message received, either suppresses a notification or transmits the notification for each message. This allows a user to receive only message notifications for those messages and chats the user is interested in reviewing. While messaging program 134 is depicted as two flow diagrams in the Figures discussed below for ease of discussion, one having skill in the art will understand the operational steps of messaging program 134 can be depicted in one flow diagram and operate as one flow.

Figure 2:
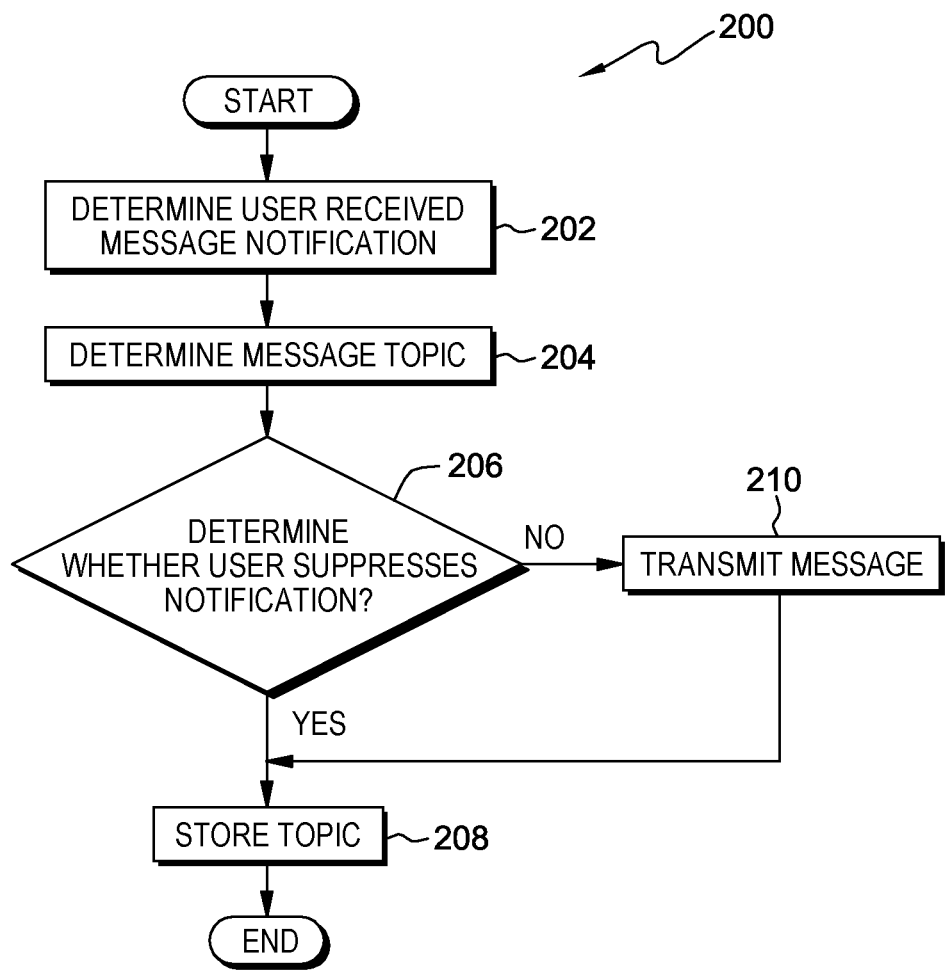
FIG. 2 is a flowchart depicting operational steps of a messaging program, for learning user preferences regarding message notification suppression, in accordance with an embodiment of the present invention.

FIG. 2 is a flowchart 200 depicting operational steps of messaging program 134 for learning user preferences regarding message notification suppression, in accordance with an embodiment of the present invention.

Messaging program 134 determines that a user received a message notification (202). Messaging program 134, residing on client computing device 130 as depicted in FIG. 1, determines that one or more of collaboration application 132 receives a message notification. The message notification may be received on the user interface of client computing device 130, and the user may be alerted to the message notification by one or more of a sound, a pop up, a vibration or any other means to alert a user on a client computing device, such as a smart phone or tablet computer. The message notification may be a notification for a message received in an ongoing communication or chat group, or the message may be an initial message in a newly created chat room or communication.

Messaging program 134 determines the topic of the message (204). Messaging program 134 may determine the topic of the message using a number of known methods, including natural language processing or keyword analysis to determine a topic of a textual message. In an embodiment, messaging program 134 can build a topic analysis microservice, which can take an input of a message, e.g., in JavaScript Object Notation (JSON) format, and then output the summary topic as an annotation embedded JSON message data. Messaging program 134 can then use the topic summary annotation as the topic of the message.

Messaging program 134 determines whether the user suppresses the notification (decision 206). If the user does not suppress the notification (decision 206, no branch), messaging program 134 transmits the message (210) to the user. The user may suppress the message notification in any number of ways, including removing a pop up from the user interface or silencing the device and thereby the notification. In embodiments of the present invention, a user can perform a gesture to indicate the message notification should be suppressed, e.g., shaking the device or sliding the message off of the user interface with a touch to the screen of the device, e.g., client computing device 130. As messaging program 134 learns user preferences for what type of gestures indicate message suppression for each type of collaboration application 132, i.e., social media, electronic mail, discussion forum, etc., messaging program 134 can create a gesture map including a set of gestures mapped to each type of collaboration application for the user. Messaging program 134 can then use the created gesture map to determine whether a gesture corresponding to an intended notification suppression is received, and if so, determine the user is suppressing a message notification for the message received in a specific type of collaboration application.

In various embodiments of the present invention, a user may set additional user preferences associated with indicating whether a message notification is suppressed or not. Messaging program 134 may utilize a user pre-determined threshold amount of time in making the determination as to whether the user suppresses the notification. For example, if a user receives a message notification, messaging program 134 may let a period of time of five minutes pass, and if the user has not performed a gesture or taken an action to suppress the notification in the five minute period of time, then messaging program 134 determines the user does not wish to suppress the notification. In another embodiment, a user may set a threshold associated with how many message notification suppressions indicate the user is not interested in the message topic. For example, if a user suppresses three message notifications associated with a certain topic, then the user indicates no interest in the topic. However, if the user only suppresses one message notification for a topic, then the user may be interested but just not at that time, e.g., may be otherwise occupied.

If the user suppresses the notification (decision 206, yes branch), messaging program 134 stores the topic (208) associated with the message notification. Messaging program 134 stores the topic for each message notification along with the user preference for whether the topic should be transmitted to the user. Therefore, each topic is stored with an indication as to whether the user suppressed the message notification for the topic or whether the message was transmitted to the user for the topic. The topic may be stored in storage within client computing device 130, or the topic may be stored by server computing device 110, another computing device, or database accessible via network 120 within data processing environment 100 (not shown).

Figure 3:
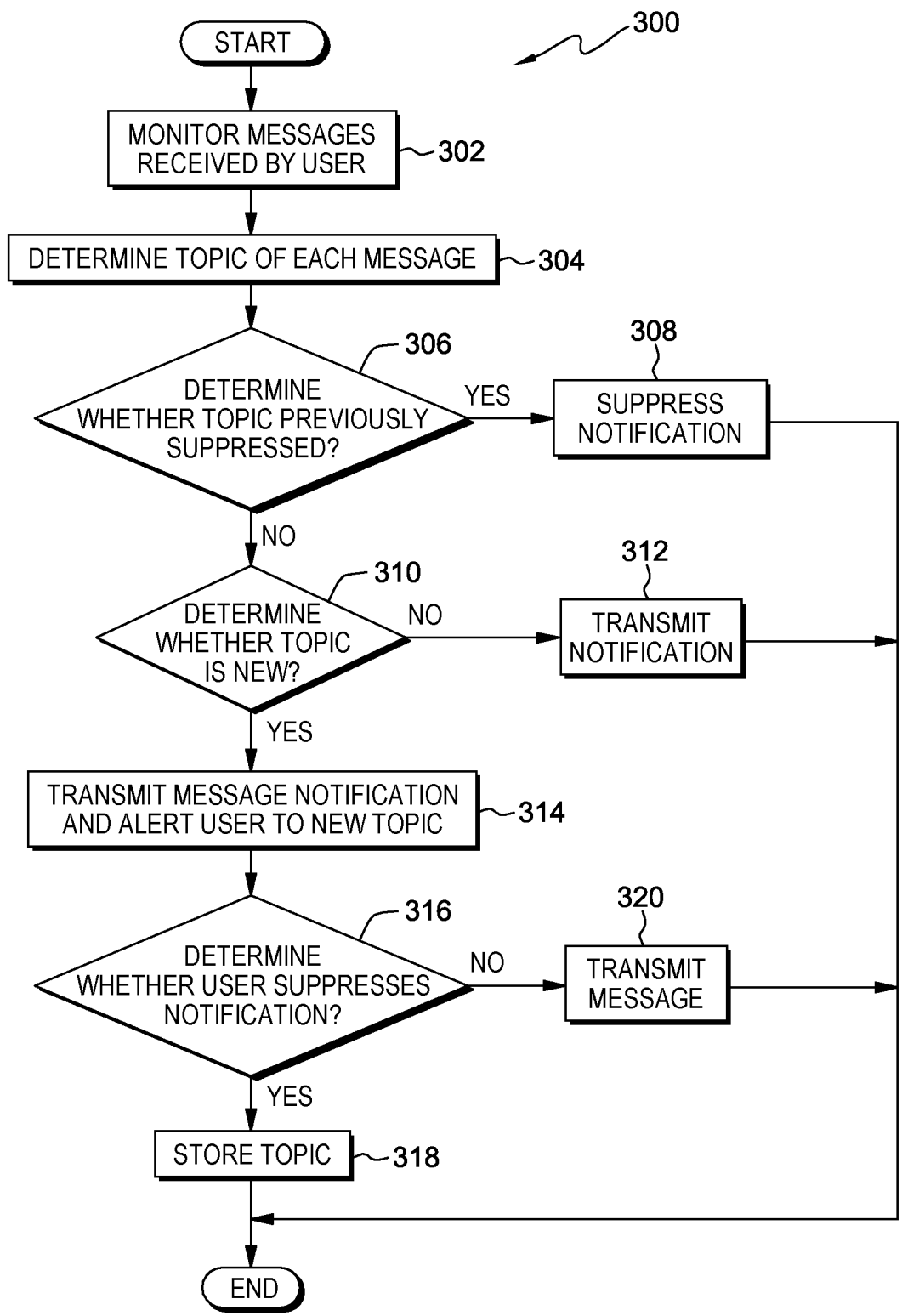
FIG. 3 is a flowchart depicting operational steps of the messaging program, for determining whether to suppress a message notification based on the learned user preferences, in accordance with an embodiment of the present invention.

FIG. 3 is a flowchart 300 depicting operational steps of messaging program 134 for determining whether to suppress a message notification based on the learned user preferences, in accordance with an embodiment of the present invention.

Messaging program 134 monitors messages received by the user (302). Messaging program 134 monitors one or more of collaboration application 132 on client computing device 130 to determine if and when messages are received. A message may be received in an ongoing communication or chat group, the message may be an initial message in a newly created chat room or communication, or the message may be any other message received via collaboration application 132.

Messaging program 134 determines the topic of each message (304). For each received message, messaging program 134 determines the topic, according to methods discussed above including natural language processing and keyword analysis. In various embodiments, in addition to determining the topic of each message, messaging program 134 determines a relevance for each message based on identifying one or more additional factors of the message, including, for example, the message sender and whether the user has a social or a business relationship with the message sender. In embodiments, messaging program 134 determines an association relevance factor for each relationship the user has with a contact, such as a social, business, or other type of contact. Based on the association relevance factor, messaging program 134 can determine which message notifications to transmit to the user. For example, a high association relevance factor indicates the user and the contact have a close relationship, and, therefore, the user is likely interested in receiving messages from the contact regardless of the current activity of the user. In another example, a low association relevance factor may indicate the user does not know the contact very well, and, therefore, the user may not be interested in receiving message from the contact at all times.

Messaging program 134 determines whether the topic was previously suppressed by the user (decision 306). If the topic was previously suppressed by the user (decision 306, yes branch), messaging program 134 suppresses the notification (308). Messaging program 134 determines, based on the learned user preferences, whether the topic associated with each message received has previously been suppressed, and, if so, messaging program 134 suppresses the message notification before the notification is sent to the user. In embodiments, messaging program 134 may include additional factors in determining whether to suppress or transmit a message notification, such as analyzing prior messages and the corresponding user action taken to those messages to determine whether to send a message notification to the user. For example, if a user responded to a prior message, then messaging program 134 associates the topic of the prior message with an indication the user is interested in the message topic. In another embodiment, messaging program 134 utilizes the association relevance of the message in determining whether or not to suppress the message notification. For example, if the message is received from a sender with which the user has a business relationship and it is during working hours, then messaging program 134 does not suppress the message notification.

If the topic was not previously suppressed (decision 306, no branch), messaging program 134 determines whether the topic is a new topic, i.e., a topic that has not yet been received by collaboration application 132 or not previously received by the user (decision 310). If the topic is not a new topic (decision 310, no branch), then the user has not previously indicated a preference to suppress notifications associated with the topic, and, therefore, messaging program 134 transmits the notification (312) to the user.

If the topic is a new topic (decision 310, yes branch), messaging program 134 transmits a message notification to the user and alerts the user to the new topic (314). If the topic associated with a received message is a new topic, indicating that the message is unrelated to previously received messages, messaging program 134 alerts the user to the new topic. In other embodiments, the message notification may not be transmitted to the user, and the alert to the new topic may be a separate message or notification to the user. The alert may be a highlight or other indication associated with the message notification or some other alert to indicate to the user that the topic of the message has not previously been received.

Messaging program 134, after transmitting the message notification and alerting the user to the new topic, determines whether the user suppresses the message notification (decision 316). If the user does not suppress the notification (decision 316, no branch), then messaging program 134 transmits the message to the user (320). For example, because the topic is new to the user and the ongoing communication, the topic of the message may be one the user is interested in reviewing.

If the user suppresses the message notification (decision 316, yes branch), then messaging program 134 stores the topic (318). Messaging program 134 stores the topic along with an indication as to whether the user suppressed the message notification, which allows messaging program 134 to utilize user preferences for the topic when future messages are received.

In various embodiments of the present invention, the user is able to review any message received by reviewing the summary or a history of the messages received, regardless of whether or not a message notification was transmitted to the user. In another embodiment, messages are stored associated with the message topic, and a user can review any message received associated with a certain topic, whether the message notification was transmitted or not. In yet another embodiment, if a user would like to receive notifications for a topic the user was previously not interested in, the user can indicate as such, for example, by updating user preferences.

In an example, user A is a member of a chat group and is responsible for scheduling meetings and booking meeting rooms. Therefore, user A is most interested in messages related to holding a meeting. Messages regarding other topics, such as activity, members, newsletter information, etc., user A is not as interested in receiving. Messaging program 134 determines that for various message topics, user A has previously suppressed one or more message notifications. Messaging program 134 then analyzes messages received in the chat group, and if a topic does not relate to scheduling a meeting, messaging program 134 suppresses the message notification. Additionally, if messaging program 134 determines user A receives a message with a new topic (i.e., not previously received or stored), messaging program 134 alerts user A that the topic is new, and user A can determine whether to suppress the message notification or receive the message. When a message is received corresponding to holding a meeting, messaging program 134 transmits the message to user A.

Figure 4:
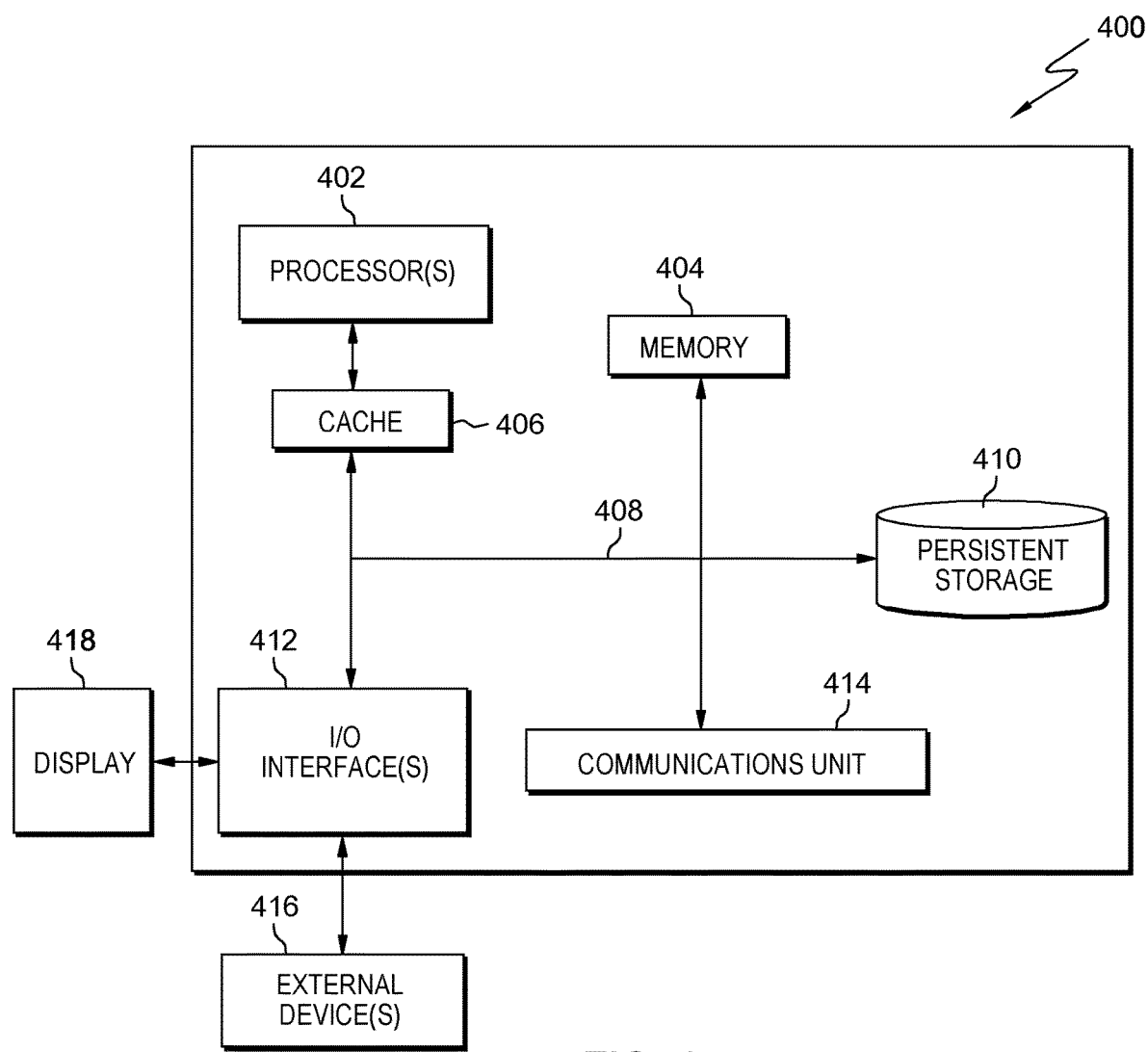
FIG. 4 is a block diagram of components of a data processing system, such as the client computing device of FIG. 1, in accordance with an embodiment of the present invention.

FIG. 4 depicts a block diagram 400 of components of server computing device 110 or client computing device 130 within data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computing device 110 or client computing device 130 can include processor(s) 402, memory 404, cache 406, persistent storage 410, input/output (I/O) interface(s) 412, communications unit 414, and communications fabric 408. Communications fabric 408 provides communications between memory 404, cache 406, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses.

Memory 404 and persistent storage 410 are computer readable storage media. In this embodiment, memory 404 includes random access memory (RAM). In general, memory 404 can include any suitable volatile or non-volatile computer readable storage media. Cache 406 is a fast memory that enhances the performance of processor(s) 402 by holding recently accessed data, and data near recently accessed data, from memory 404.

Program instructions and data used to practice embodiments of the present invention, such as messaging program 134, can be stored in persistent storage 410 for execution and/or access by one or more of the respective processor(s) 402 of client computing device 130 via cache 406. In this embodiment, persistent storage 410 includes a magnetic hard disk drive. Alternatively, or in addition to a magnetic hard disk drive, persistent storage 410 can include a solid-state hard drive, a semiconductor storage device, a read-only memory (ROM), an erasable programmable read-only memory (EPROM), a flash memory, or any other computer readable storage media or device that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer readable storage medium that is also part of persistent storage 410.

Communications unit 414, in these examples, provides for communications with other data processing systems or devices, including resources of server computing device 110 or client computing device 130. In these examples, communications unit 414 includes one or more network interface cards. Communications unit 414 may provide communications through the use of either or both physical and wireless communications links. Software and data used to practice embodiments of the present invention, for example, messaging program 134, may be downloaded to persistent storage 410 through communications unit 414.

I/O interface(s) 412 allows for input and output of data with other devices that may be connected to server computing device 110 or client computing device 130. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 410 via I/O interface(s) 412. I/O interface(s) 412 also connect to a display 418.

Display 418 provides a mechanism to display data to a user and may be, for example, a computer monitor or an incorporated display screen, such as is used, for example, in tablet computers and smart phones.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
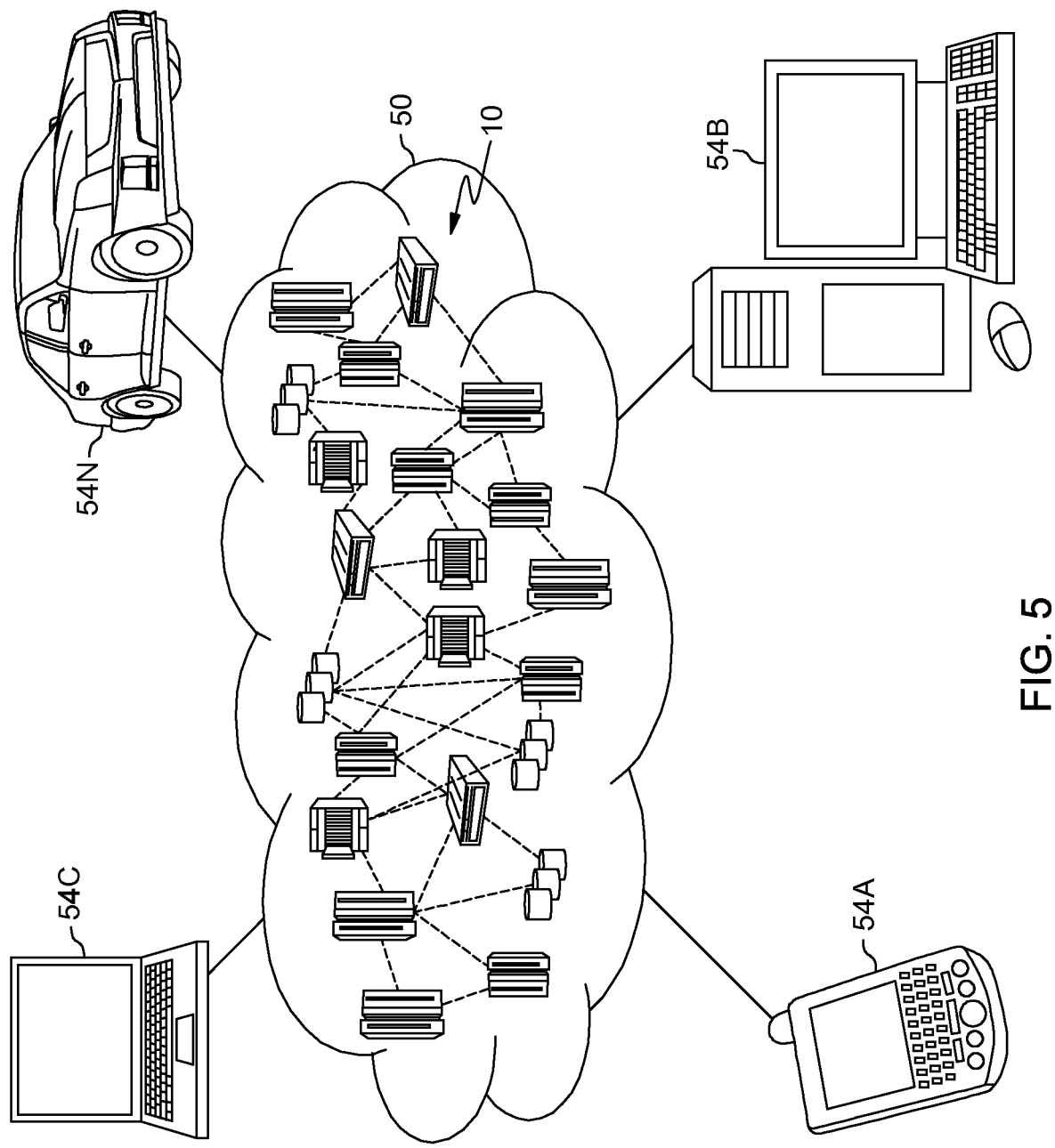
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 50 can communicate with any type of computerized device over any type of network and/or network addressable connection (e.g., using a web browser). In various embodiments, cloud computing node 10 is a computer system including components and capabilities as discussed with respect to FIG. 4.

Figure 6:
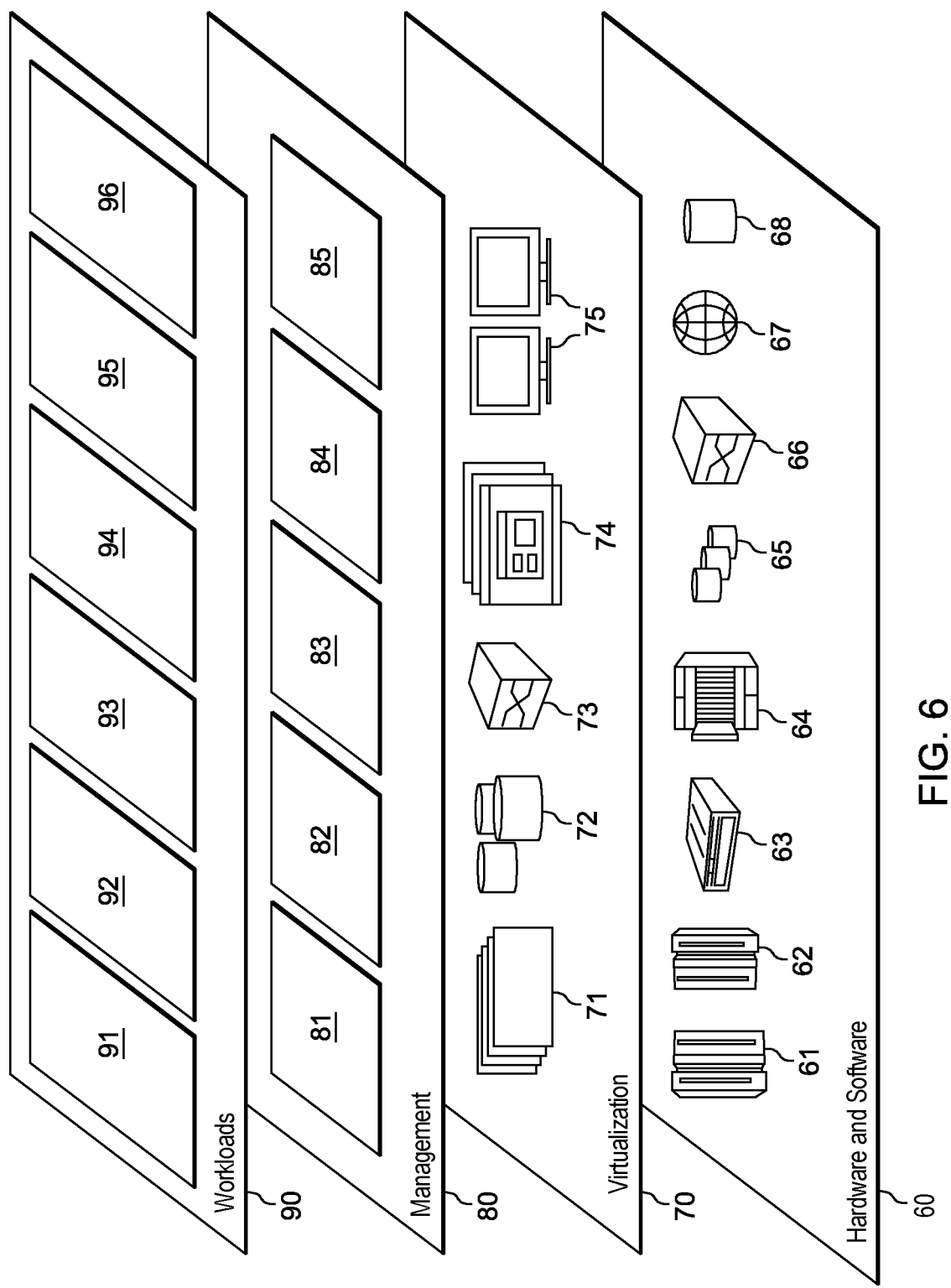
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and messaging program 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing message notification in a computing environment, the method comprising:
   determining, by one or more computer processors, a user receives a notification of a first message received in a collaboration application on a computing device of the user;
   determining, by the one or more computer processors, a topic for the first message based on a keyword analysis of the content of the first message;
   calculating, by the one or more computer processors, an association relevance factor for the first message based on a message sender and a relationship with the message sender and the user;
   determining, by the one or more computer processors, one or more user preferences associated with the first message and the determined topic of the first message, wherein user preferences include associated gesture maps, a threshold amount of time for message notification suppression, and a threshold amount of message notification suppressions;
   determining, by the one or more computer processors, whether the user suppresses the notification of the first message; and
   responsive to determining the user suppresses the notification, storing, by the one or more computer processors, the topic, the sender, and association relevance factor for the first message associated with an indication the user suppressed the notification for the collaboration application.

2. The method of claim 1, further comprising:
   determining, by the one or more computer processors, a second message is received on the computing device of the user;
   determining, by the one or more computer processors, a topic of the second message;
   determining, by the one or more computer processors, whether the user previously suppressed the topic of the second message; and
   responsive to determining the user previously suppressed the topic of the second message, suppressing, by the one or more computer processors, a notification for the second message.

3. The method of claim 2, further comprising:
   responsive to determining the user did not previously suppress the topic of the second message, determining, by the one or more computer processors, whether the topic is new; and
   responsive to determining the topic of the second message is new, alerting, by the one or more computer processors, the user to the topic of the second message.

4. The method of claim 3, further comprising:
   determining, by the one or more computer processors, whether the user suppresses a notification associated with the second message; and
   responsive to determining the user suppressed the notification associated with the second message, storing, by the one or more computer processors, the topic of the second message associated with an indication the user suppressed the notification.

5. The method of claim 1, wherein determining whether the user suppresses the notification of the first message further comprises:
   determining, by the one or more computer processors, a gesture received from the user;
   determining, by the one or more computer processors, whether the gesture corresponds to a gesture map stored for the collaboration application; and
   responsive to determining the gesture corresponds to the gesture map for the collaboration application, suppressing, by the one or more computer processors, the notification.

6. The method of claim 1, further comprising:
   responsive to determining the user did not suppress the notification, transmitting, by the one or more computer processors, the first message; and
   storing, by the one or more computer processors, the topic for the first message associated with an indication the user did not suppress the notification for the collaboration application.

7. The method of claim 1, wherein determining whether the user suppresses the notification of the first message further comprises determining, by the one or more computer processors, the user does not perform a gesture to the computing device in a threshold period of time, wherein the threshold period of time is pre-determined by the user.

8. A computer program product comprising:
   one or more computer readable storage devices and program instructions stored on the one or more computer readable storage devices, the stored program instructions comprising:
   program instructions to determine a user receives a notification of a first message received in a collaboration application on a computing device of the user;
   program instructions to determine a topic for the first message based on a keyword analysis of the content of the first message;
   program instructions to calculate an association relevance factor for the first message based on a message sender and a relationship with the message sender and the user;
   program instructions to determine one or more user preferences associated with the first message and the determined topic of the first message, wherein user preferences include associated gesture maps, a threshold amount of time for message notification suppression, and a threshold amount of message notification suppressions;
   program instructions to determine whether the user suppresses the notification of the first message; and
   responsive to determining the user suppresses the notification, program instructions to store the topic, the sender, and association relevance factor for the first message associated with an indication the user suppressed the notification for the collaboration application.

9. The computer program product of claim 8, further comprising:
program instructions to determine a second message is received on the computing device of the user;
program instructions to determine a topic of the second message;
program instructions to determine whether the user previously suppressed the topic of the second message; and
responsive to determining the user previously suppressed the topic of the second message, program instructions to suppress a notification for the second message.

10. The computer program product of claim 9, further comprising:
responsive to determining the user did not previously suppress the topic of the second message, program instructions to determine whether the topic is new; and
responsive to determining the topic of the second message is new, program instructions to alert the user to the topic of the second message.

11. The computer program product of claim 10, further comprising:
program instructions to determine whether the user suppresses a notification associated with the second message; and
responsive to determining the user suppressed the notification associated with the second message, program instructions to store the topic of the second message associated with an indication the user suppressed the notification.

12. The computer program product of claim 8, wherein determining whether the user suppresses the notification of the first message further comprises:
program instructions to determine a gesture received from the user;
program instructions to determine whether the gesture corresponds to a gesture map stored for the collaboration application; and
responsive to determining the gesture corresponds to the gesture map for the collaboration application, program instructions to suppress the notification.

13. The computer program product of claim 8, further comprising:
responsive to determining the user did not suppress the notification, program instructions to transmit the first message; and
program instructions to store the topic for the first message associated with an indication the user did not suppress the notification for the collaboration application.

14. The computer program product of claim 8, wherein determining whether the user suppresses the notification of the first message further comprises program instructions to determine the user does not perform a gesture to the computing device in a threshold period of time, wherein the threshold period of time is pre-determined by the user.

15. A computer system comprising:
one or more computer processors;
one or more computer readable storage devices;
program instructions stored on the one or more computer readable storage devices for execution by at least one of the one or more computer processors, the stored program instructions comprising:
program instructions to determine a user receives a notification of a first message received in a collaboration application on a computing device of the user;
program instructions to determine a topic for the first message based on a keyword analysis of the content of the first message;
program instructions to calculate an association relevance factor for the first message based on a message sender and a relationship with the message sender and the user;
program instructions to determine one or more user preferences associated with the first message and the determined topic of the first message, wherein user preferences include associated gesture maps, a threshold amount of time for message notification suppression, and a threshold amount of message notification suppressions;
program instructions to determine whether the user suppresses the notification of the first message; and
responsive to determining the user suppresses the notification, program instructions to store the topic, the sender, and association relevance factor for the first message associated with an indication the user suppressed the notification for the collaboration application.

16. The computer system of claim 15, further comprising:
program instructions to determine a second message is received on the computing device of the user;
program instructions to determine a topic of the second message;
program instructions to determine whether the user previously suppressed the topic of the second message; and
responsive to determining the user previously suppressed the topic of the second message, program instructions to suppress a notification for the second message.

17. The computer system of claim 16, further comprising:
responsive to determining the user did not previously suppress the topic of the second message, program instructions to determine whether the topic is new; and
responsive to determining the topic of the second message is new, program instructions to alert the user to the topic of the second message.

18. The computer system of claim 17, further comprising:
program instructions to determine whether the user suppresses a notification associated with the second message; and
responsive to determining the user suppressed the notification associated with the second message, program instructions to store the topic of the second message associated with an indication the user suppressed the notification.

19. The computer system of claim 15, wherein determining whether the user suppresses the notification of the first message further comprises:
program instructions to determine a gesture received from the user;
program instructions to determine whether the gesture corresponds to a gesture map stored for the collaboration application; and
responsive to determining the gesture corresponds to the gesture map for the collaboration application, program instructions to suppress the notification.

20. The computer system of claim 15, wherein determining whether the user suppresses the notification of the first message further comprises program instructions to determine the user does not perform a gesture to the computing device in a threshold period of time, wherein the threshold period of time is pre-determined by the user.

* * * * *